(12) United States Patent
Evans et al.

(10) Patent No.: US 6,371,201 B1
(45) Date of Patent: *Apr. 16, 2002

(54) HEAT EXCHANGER AND METHOD OF ASSEMBLY FOR AUTOMOTIVE VEHICLES

(75) Inventors: Tim V. Evans, Ypsilanti; Matthew J. Zaluzec, Canton; Gerry A. Grab, Trenton; Henry Mehraban, Northville; Jeffrey S. Southwood, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/627,863

(22) Filed: Apr. 3, 1996

(51) Int. Cl.[7] .................................................. F28F 1/00
(52) U.S. Cl. ........................ 165/177; 165/133; 165/179; 228/219; 428/654
(58) Field of Search ............................... 165/177, 179, 165/133; 428/654; 228/219

(56) References Cited

U.S. PATENT DOCUMENTS

| | | | |
|---|---|---|---|
| 3,370,343 A | 2/1968 | Martin | |
| 3,373,483 A | 3/1968 | Miller | |
| 3,378,914 A | 4/1968 | Miller | |
| 3,878,871 A | * 4/1975 | Anthony et al. | 165/134.1 X |
| 3,973,718 A | 8/1976 | Deschamps | |
| 4,173,302 A | * 11/1979 | Schultze et al. | 228/219 |
| 4,203,490 A | * 5/1980 | Terai et al. | 165/180 X |
| 4,240,574 A | 12/1980 | Schmatz et al. | |
| 4,357,397 A | 11/1982 | Baba et al. | |
| 4,401,254 A | 8/1983 | Tramontini | |
| 4,626,295 A | 12/1986 | Sasaki et al. | |
| 4,721,653 A | 1/1988 | Oda et al. | |
| 4,758,273 A | 7/1988 | Gilman et al. | |
| 4,785,092 A | 11/1988 | Nanba et al. | |
| 4,906,534 A | * 3/1990 | Bekki et al. | 428/654 |
| 5,069,980 A | 12/1991 | Namba et al. | |
| 5,125,452 A | 6/1992 | Yamauchi et al. | |
| 5,148,862 A | 9/1992 | Hashiura et al. | |
| 5,171,377 A | 12/1992 | Shimizu et al. | |
| 5,180,098 A | 1/1993 | Halstead et al. | |
| 5,232,521 A | 8/1993 | Takahashi et al. | |
| 5,260,142 A | * 11/1993 | Kawabe et al. | 165/180 X |
| 5,332,455 A | * 7/1994 | Chang et al. | 428/654 X |
| 5,350,436 A | 9/1994 | Takezoe et al. | |
| 5,422,191 A | 6/1995 | Childree | 428/654 |
| 5,560,425 A | * 10/1996 | Sugawara et al. | 165/179 X |
| 5,762,132 A | * 6/1998 | Evans et al. | 165/133 |
| 5,771,962 A | * 6/1998 | Evans et al. | 165/133 |

FOREIGN PATENT DOCUMENTS

EP 0637481 A 2/1995

* cited by examiner

Primary Examiner—Christopher Atkinson
(74) Attorney, Agent, or Firm—Raymond L. Coppiellie

(57) ABSTRACT

A heat exchanger and method of assembly for an automotive vehicle includes at least one tube having an internal surface and an external surface, and a composition cladding having at least magnesium applied to the internal surface and external surface of the tube.

14 Claims, 2 Drawing Sheets

HEAT EXCHANGER AND METHOD OF ASSEMBLY FOR AUTOMOTIVE VEHICLES

BACKGROUND OF THE INVENTION

1. Field of the Invention

The present invention relates generally to heat exchangers and, more specifically, to a heat exchanger and method of assembly for an automotive vehicle.

2. Description of the Related Art

It is known to provide automotive vehicles with heat exchangers such as condensers, evaporators, heater cores and coolers. These heat exchangers are alternating rows of tubes or plates with convoluted fins made of a metal material such as aluminum or an aluminum alloy. Many of these heat exchangers have turbulators disposed within the tubes that require internal brazing. Previously, the tubes and turbulators have been brazed in a vacuum furnace. Recently, a process known as "controlled atmosphere (CAB)" furnace brazing has been used with non-corrosive fluxes. CAB furnace brazing has been preferred over vacuum furnace brazing due to improved production yields, lower furnace maintenance requirements and greater braze process robustness.

It is also known that the CAB furnace brazing currently used to manufacture aluminum heat exchangers requires the use of fluxing agents, either chloride based or fluoride based. The use of fluxing agents with conventional aluminum heat exchangers promotes the dissociation and disruption of the native aluminum oxide and magnesium oxide layers present on the surface of the aluminum heat exchanger to promote wetting of the molten clad layer between mating components.

Although CAB furnace brazing has worked well, it suffers from the disadvantage that the internal tube surfaces and the turbulator of the heat exchanger require individual fluxing before assembly and an overall fluxing of the completed assembly before brazing. Also, CAB furnace brazing suffers from the disadvantage that flux residues can block internal tube passages. Further, CAB furnace brazing suffers from the disadvantage that the individual fluxing of the components of the heat exchanger is costly and time consuming.

It is further known that the tubes of the heat exchanger are generally welded along a seam located at an end radius of the tubes. During the welding process, an external cladding on the tube is typically disrupted and missing from an external surface of the tube before brazing. The absence of cladding on the external surface of the tube can lead to lower strength and durability of the tube along and surrounding the weld seam, which is undesired.

SUMMARY OF THE INVENTION

Accordingly, the present invention is a heat exchanger assembly for an automotive vehicle including at least one tube having an internal surface and an external surface and a composition cladding having at least magnesium applied to the internal surface and external surface of the tube.

Also, the present invention is a method of assembly of a heat exchanger for an automotive vehicle including the steps of providing at least one tube having an internal surface and an external surface. The method includes the steps of applying a composition cladding having at least magnesium to the internal surface and external surface of the tube.

One advantage of the present invention is that a heat exchanger assembly is provided for an automotive vehicle that has a composition cladding having at least elemental magnesium that allows for fluxless internal brazing of the heat exchanger assembly without the application of a fluxing agent to promote oxide layer breakdown. Another advantage of the present invention is that the heat exchanger assembly has an internal row of dimples to act as a turbulator and improve tube strength for durability. Yet another advantage of the present invention is that the heat exchanger assembly eliminates the use of flux and is less expensive and less time consuming to manufacture. A further advantage of the present invention is that a method of assembly of the heat exchanger is provided which eliminates flux residues that can block internal tube passages. Yet a further advantage of the present invention is that the heat exchanger assembly has a tube with a double side composition cladding in which the internal composition cladding can be used to reinforce the weld seam region of the tube. Still a further advantage of the present invention is that the internal composition cladding reinforces the weld seam to increase the strength and pressure cycling durability of the tube.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
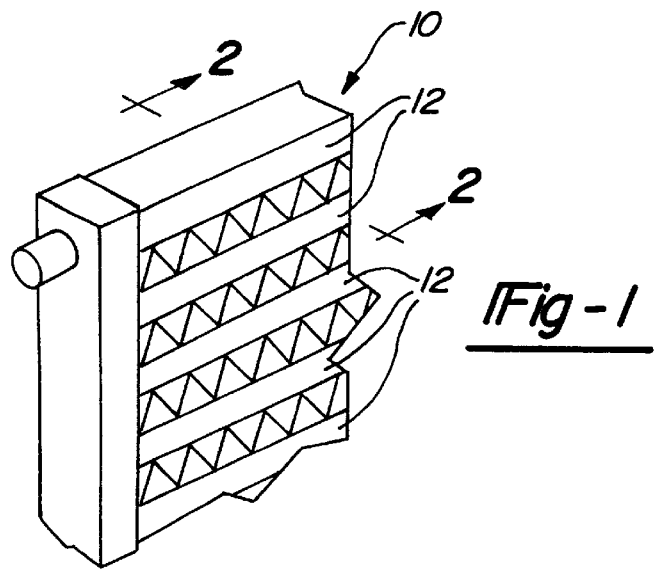
FIG. 1 is a partial perspective view of a heat exchanger assembly according to the present invention.

Referring to FIG. 1, one embodiment of a heat exchanger assembly 10, according to the present invention, is shown. In this example, the heat exchanger assembly 10 is a condenser for an air conditioning system (not shown) of a vehicle such as an automotive vehicle (not shown). It should be appreciated that the heat exchanger assembly 10 may be a parallel flow condenser, serpentine evaporator, heater core, or transmission oil cooler.

Figure 2:
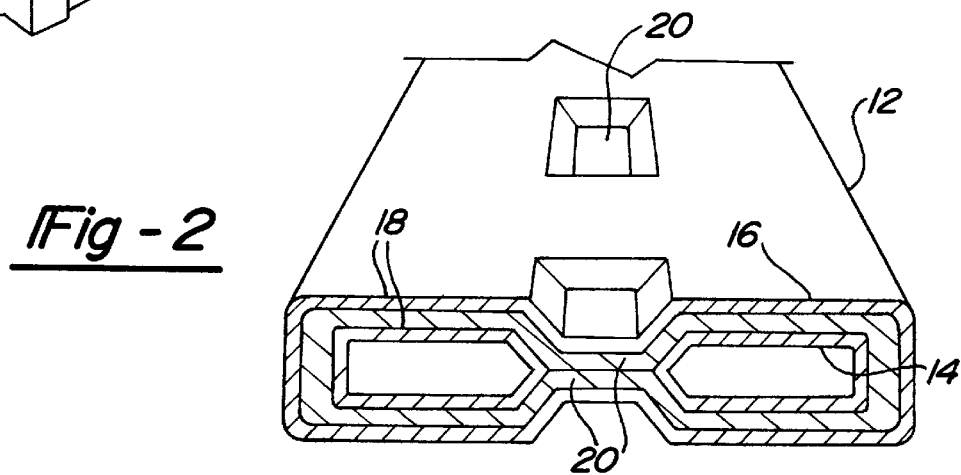
FIG. 2 is a sectional view taken along line 2—2 of FIG. 1.

Referring to FIG. 2, the heat exchanger assembly 10 includes at least one, preferably a plurality of tubes 12. Each tube 12 extends longitudinally and is generally rectangular in shape. Each tube 12 is made of a core material having an internal surface 14 and an external surface 16. The internal surface 14 and external surface 16 each have a composition cladding 18 thereon. The composition cladding 18 contains lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to about 13%, manganese (Mn) within a range from about 0 to about 1%, copper (Cu) within a range from about 0.01% to 0.1%, zinc (Zn) within a range from about 0 to about 0.3%, beryllium (Be) within a range from about 0.01% to about 0.7%, other impurities not exceeding a total of 1%, balance aluminum. The core material of the tube 12 is made of an aluminum based material selected from the Aluminum Association 3xxx, 5xxx and 6xxx series aluminum alloys. It should be appreciated that the composition cladding 18 is made by rolling aluminum sheets of different alloys which are clad to the surfaces 14 and 16 of the tube 12 by methods well known in the art.

Figure 3:
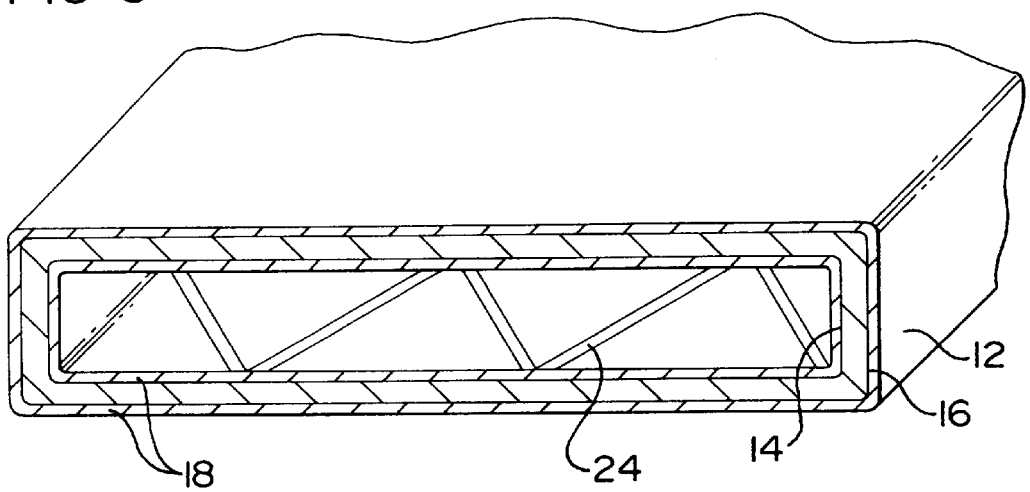
FIG. 3 is a sectional view of another embodiment of the heat exchanger assembly of FIG. 1.

Referring to FIG. 3, in one embodiment, the heat exchanger assembly 10 includes at least one component disposed adjacent the composition cladding 18 on the internal surface 14 of the tube 12. For example, the heat exchanger assembly 10 includes a turbulator 24 disposed within the tube 12 adjacent the composition cladding 18 on the internal surface 14. The turbulator 24 extends longitudinally and laterally in a series of undulations. The turbulator 24 breaks up the flow through the tube 12 to effect heat transfer. The turbulator 24 is made of an aluminum based material of the Aluminum Association 3xxx series aluminum alloys.

For assembly of the heat exchanger assembly 10, the turbulator 24 is joined to the tube 12 using a CAB furnace brazing process. During the brazing process, the Li-Mg content in the composition cladding 18 liquifies at or about 550° C. and flows through a porous aluminum oxide ($Al_2O_3$) layer on the internal surface 14 to wet the internal surface 14. This wetting provides the medium to continue the dispersement of the oxide layer and allows the composition cladding 18 to flow into a joint therebetween and create a braze. It should be appreciated that the CAB furnace brazing process is conventional and known in the art.

Figure 4:
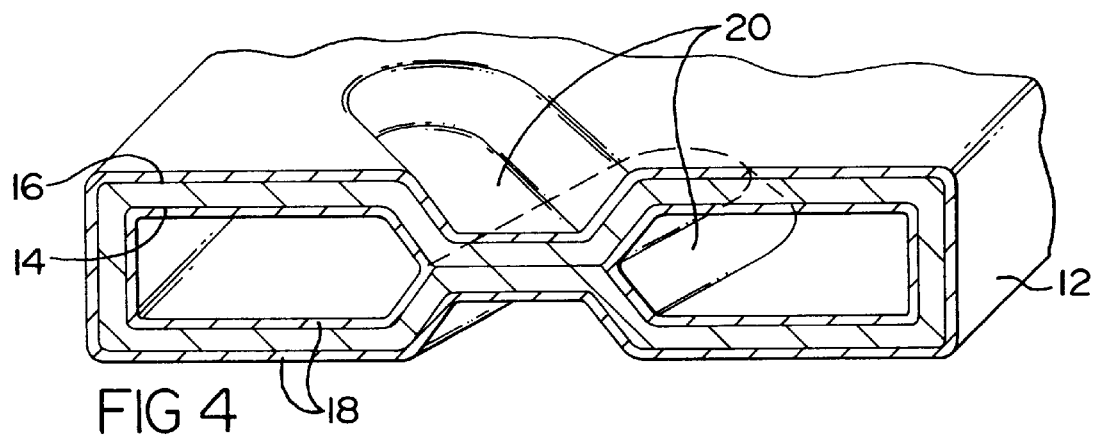
FIG. 4 is a view similar to FIG. 2 of yet another embodiment of the heat exchanger assembly of FIG. 1.
Figure 5:
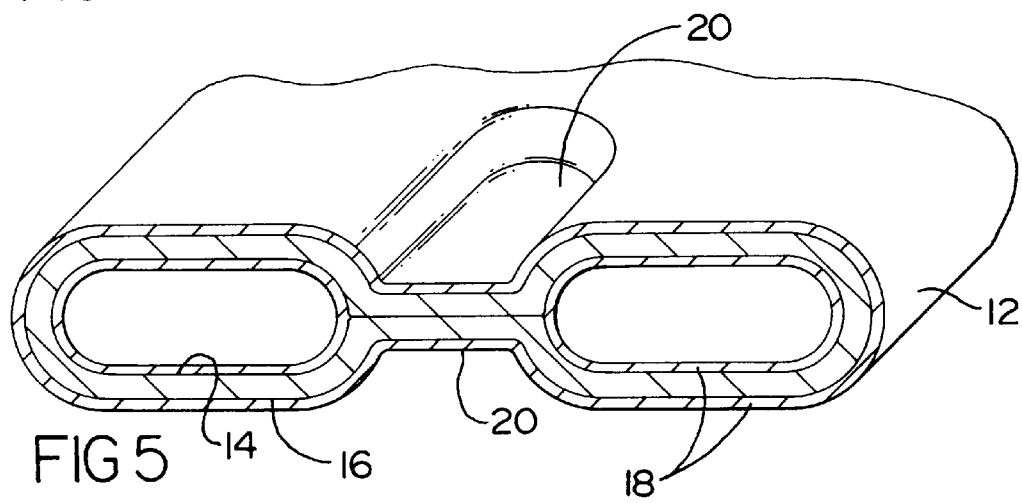
FIG. 5 is a view similar to FIG. 2 of still another embodiment of the heat exchanger assembly of FIG. 1.

Referring to FIGS. 2, 4 and 5, in another embodiment, each tube 12 has at least one, preferably a plurality of opposed dimples 20 extending toward each other from the internal surface 14. The dimples 20 are spaced longitudinally along the tube 12 and extend inwardly into a flow path of the tube 12 from the external surface 16 to the internal surface 14. The dimples 20 are generally rectangular in shape although any suitable shape may be used such as generally oval illustrated in FIGS. 4 and 5. The dimples 20 may be orientated longitudinally along a longitudinal axis as illustrated in FIG. 4 or at an angle to each other as illustrated in FIG. 5 to form a cross bar pattern. The tube 12 is initially formed as a sheet and the dimples 20 stamped on the sheet. The sheet is then folded over to form the tube 12. The tube 12 has a seam which is welded as will be described in conjunction with FIGS. 6 and 7. The composition cladding 18 on the internal surface 14 is used to join the dimples 20 together using a controlled atmosphere brazing (CAB) process. The brazed dimples 20 provide increased stiffening and strength to the tube 12 and act as a turbulator to interrupt fluid flow through the tube 12. It should be appreciated that controlled atmosphere brazing is conventional and known in the art.

Figure 6:
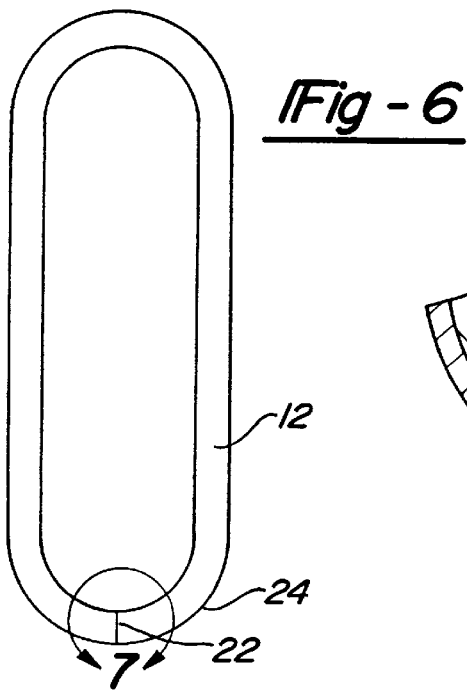
FIG. 6 is an elevational view of another portion of the heat exchanger assembly of FIG. 1.
Figure 7:
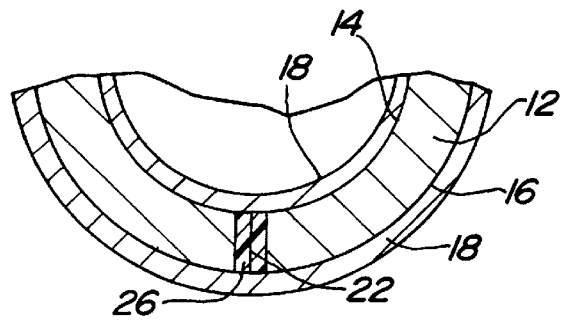
FIG. 7 an enlarged view of circle 4 in FIG. 3.

Referring to FIGS. 6 and 7, another embodiment of the heat exchanger assembly 10, according to the present invention, is shown. The tube 12 may have a seam located along an end radius 24 of the tube 12. The tube 12 has a weld 26 along the seam 22. The composition cladding 18 on the internal surface 14 has thickness within a range from about 2% to about 10% of the overall thickness of the tube 12 and the composition cladding 18 on the external surface 16 has a thickness within a range from about 8% to about 12% of the overall thickness of the tube 12. It should be appreciated that the seam 22 is welded by a MIG welding process prior to controlled atmosphere brazing which is conventional and known in the art.

During assembly, the tubes 12 are assembled into the heat exchanger assembly 10 to ensure that all seams 22 are on the same face side. The heat exchanger assembly 10 in placed in a CAB furnace (not shown) with the tubes 12 perpendicular to a conveyor or belt (not shown) of the CAB furnace with the weld seam 22 facing down. When the composition cladding 18 on the internal surface 14 begins to melt, a portion of the composition cladding 18 will flow across and fill internal surface cracks and the seam 22 to leave a high strength diffusion layer upon the weld seam 22. It should be appreciated that, during the CAB process, the composition cladding 18 will flow and, by capillary action, wet and fill the seam 22 and cracks therein.

Additionally, a method, according to the present invention, of assembly of the heat exchanger assembly 10 is disclosed. The method includes the steps of providing at least one tube 12 having an internal surface 14 and an external surface 16 and applying a composition cladding 18 having at least magnesium to either one of the internal surface 14 or external surface 16. The method may include disposing at least one component 24 adjacent the composition cladding 18 on the internal surface 14 and joining the at least one tube 12 and at least one component 24 together using a controlled atmosphere brazing (CAB) process.

In the CAB process, the heat exchanger assembly 10 is placed on a braze holding furnace fixture (not shown) and preheated, for example, to a temperature in a range from about 425° to about 475° F. (224°–246° C.). The heat exchanger assembly 10 and braze holding furnace fixture are transferred to a prebraze chamber where it is soaked for about 3–15 minutes at about 750° F. (399° C.). Subsequently, the hot heat exchanger assembly 10 and braze holding furnace fixture are transferred to a conveyor and moved through a CAB furnace. In the CAB furnace, the heat exchanger assembly 10 is kept for 2–3 minutes at about 1095°–1130° F. (591°–610° C.). The brazed heat exchanger assembly 10 is then cooled, removed and applied for its intended use.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A heat exchanger assembly for an automotive vehicle comprising:

at least one tube having an internal surface and an external surface; and a composition cladding having at least magnesium applied to said internal surface and said external surface of said at least one tube;

said at least one tube comprising an aluminum based material selected from the Aluminum Association 3xxx, 5xxx and 6xxx series aluminum alloys; and said composition cladding comprising lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to 13%, manganese (Mn) within a range from about 0% to about 1%, copper (Cu) within a range from about 0.01% to about 0.1%, zinc (Zn) within a range from about 0% to about 0.3%, beryllium (Be) within a range from about 0.01% to about 0.7%, other impurities not exceeding a total of 1%, balance aluminum; and at least one component disposed adjacent said composition cladding, said at least one tube and said at least one component being joined together by fluxless brazing with said composition cladding using a controlled atmosphere brazing process.

2. A heat exchanger assembly as set forth in claim 1 wherein said at least one tube has a plurality of opposed dimples extending toward each other from said internal surface, whereby the dimples are joined together using the controlled atmosphere brazing process.

3. A heat exchanger assembly as set forth in claim 2 wherein said dimples are rectangular in shape.

4. A heat exchanger assembly as set forth in claim 2 wherein said dimples are oval in shape.

5. A heat exchanger assembly as set forth in claim 2 wherein said dimples are orientated at an angle to form a cross bar pattern.

6. A heat exchanger assembly as set forth in claim 1 wherein said at least one component is disposed adjacent said composition cladding on said internal surface, whereby said at least one tube and said at least one component are joined together using the controlled atmosphere brazing process.

7. A heat exchanger assembly as set forth in claim 6 wherein said at least one component comprises a turbulator disposed within said tube adjacent said composition cladding on said internal surface and said at least one component comprises an aluminum based material of the Aluminum Association 3xxx series aluminum alloys.

8. A heat exchanger assembly as set forth in claim 1 wherein said at least one tube has a seam located along an end radius of said tube and a portion of said composition cladding on said internal surface is disposed into said seam.

9. A heat exchanger assembly as set forth in claim 1 wherein said at least one tube has said composition cladding on said internal surface of a thickness within a range from about 2% to about 10% of an overall thickness of said at least one tube.

10. A heat exchanger assembly for an automotive vehicle comprising:
   at least one tube made of an aluminum based material having an internal surface and an external surface;
   a lithium-magnesium composition cladding applied to said internal surface and said external surface of said at least one tube, said composition cladding comprising lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to 13%, manganese (Mn) within a range from about 0% to about 1%, copper (Cu) within a range from about 0.01% to about 0.1%, zinc (Zn) within a range from about 0% to about 0.3%, beryllium (Be) within a range from about 0.01% to about 0.7%, other impurities not exceeding a total of 1%, balance aluminum; and
   said at least one tube made of an aluminum based material and having a plurality of opposed dimples extending toward each other from said internal surface and joined together by fluxless internal brazing with said composition cladding on said internal surface within a controlled atmosphere brazing process.

11. A heat exchanger assembly for an automotive vehicle comprising:
   at least one tube having an internal surface and an external surface;
   a composition cladding having at least magnesium applied to said internal surface and said external surface of said at least one tube, said composition cladding comprising lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to 13%, manganese (Mn) within a range from about 0% to about 1%, copper (Cu) within a range from about 0.01% to about 0.1%, zinc (Zn) within a range from about 0% to about 0.3%, beryllium (Be) within a range from about 0.01% to about 0.7%, other impurities not exceeding a total of 1%, balance aluminum; and
   said at least one tube having a seam located along an end radius of said at least one tube and a portion of said composition cladding on said internal surface being disposed into said seam upon fluxless brazing with said composition cladding within a controlled atmosphere brazing process.

12. A heat exchanger assembly for an automotive vehicle comprising:
   at least one tube having an internal surface and an external surface;
   a composition cladding having at least magnesium applied to said internal surface and said external surface of said at least one tube, said composition cladding comprising lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to 13%, manganese (Mn) within a range from about 0% to about 1%, copper (Cu) within a range from about 0.01% to about 0.1%, zinc (Zn) within a range from about 0% to about 0.3%, beryllium (Be) within a range from about 0.01% to about 0.7%, other impurities not exceeding a total of 1%, balance aluminum; and
   at least one component disposed adjacent said composition cladding on said internal surface, said at least one tube and said at least one component being joined together by fluxless internal brazing with said composition cladding using a controlled atmosphere brazing process.

13. A heat exchanger assembly for an automotive vehicle comprising:
   at least one tube made of an aluminum based material having an internal surface and an external surface;
   a lithium-magnesium composition cladding applied to said internal surface and said external surface of said at least one tube, said composition cladding comprising lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to 13%, manganese (Mn) within a range from about 0% to about 1%, copper (Cu) within a range from about 0.01% to about 0.1%, zinc (Zn) within a range from about 0% to about 0.3%, beryllium (Be) within a range from about 0.01% to about 0.7%, other impurities not exceeding a total of 1%, balance aluminum; and
   said at least one tube made of an aluminum based material and having a generally rectangular cross-section with a plurality of opposed dimples disposed near a center of said at least one tube and spaced longitudinally therealong and extending toward each other from said internal surface and joined together by fluxless internal brazing with said composition cladding on said internal surface within a controlled atmosphere brazing process.

14. A heat exchanger assembly for an automotive vehicle comprising:

at least one tube made of an aluminum based material having an internal surface and an external surface;

a lithium-magnesium composition cladding applied to said internal surface and said external surface of said at least one tube, said composition cladding comprising lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to 13%, manganese (Mn) within a range from about 0% to about 1%, copper (Cu) within a range from about 0.01% to about 0.1%, zinc (Zn) within a range from about 0% to about 0.3%, beryllium (Be) within a range from about 0.01% to about 0.7%, other impurities not exceeding a total of 1%, balance aluminum; and said at least one tube made of an aluminum based material and having a generally oval cross-section with a plurality of opposed dimples disposed near a center of said at least one tube and spaced longitudinally therealong and extending toward each other from said internal surface and joined together by fluxless internal brazing with said composition cladding on said internal surface within a controlled atmosphere brazing process.

\* \* \* \* \*